(12) United States Patent
Lagarde et al.

(10) Patent No.: US 11,643,874 B2
(45) Date of Patent: May 9, 2023

(54) ELECTROMECHANICAL HOME-AUTOMATION ACTUATOR

(71) Applicant: SOMFY ACTIVITES SA, Cluses (FR)

(72) Inventors: Eric Lagarde, Sallanches (FR); Héléna Robert, Magland (FR); Dylan Mohamed, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 207 days.

(21) Appl. No.: 17/288,724

(22) PCT Filed: Oct. 25, 2019

(86) PCT No.: PCT/EP2019/079196
§ 371 (c)(1),
(2) Date: Apr. 26, 2021

(87) PCT Pub. No.: WO2020/084118
PCT Pub. Date: Apr. 30, 2020

(65) Prior Publication Data
US 2021/0396076 A1  Dec. 23, 2021

(30) Foreign Application Priority Data

Oct. 25, 2018 (FR) .................................. 1859886
Dec. 21, 2018 (FR) .................................. 1874064

(51) Int. Cl.
*E06B 9/72* (2006.01)
*E06B 9/17* (2006.01)
(Continued)

(52) U.S. Cl.
CPC ............ *E06B 9/72* (2013.01); *E06B 9/17076* (2013.01); *E06B 9/70* (2013.01); *F16D 3/04* (2013.01); *H02K 7/003* (2013.01); *E06B 9/264* (2013.01)

(58) Field of Classification Search
CPC ... E06B 9/72; E06B 9/70; E06B 9/264; E06B 9/17076; F16D 3/04; H02K 7/003
See application file for complete search history.

(56) References Cited

U.S. PATENT DOCUMENTS 5,467,266 A  11/1995 Jacobs et al.
5,671,387 A  9/1997 Jacobs et al.
(Continued)

FOREIGN PATENT DOCUMENTS

DE  19736770 A1  3/1999
EP  0531079 A1  3/1993
(Continued)

OTHER PUBLICATIONS

International Search Report and Written Opinion dated Dec. 10, 2019 in counterpart application No. PCT/EP2019/079196; w/ English machine translation (total 19 pages).
(Continued)

*Primary Examiner* — Beth A Stephan
(74) *Attorney, Agent, or Firm* — Seckel IP, PLLC

(57) ABSTRACT

An electromechanical actuator (11) for a closure, obscuring or solar protection installation (6) includes a motor assembly (16), including an electric motor (261) and a reduction gearbox (265), first and second (133) mechanical modules for filtering vibrations, and an output shaft (20), inserted at least partially in a casing (17), the electromechanical actuator (11) extends along a longitudinal axis (X), the first and the second mechanical modules (33, 133) being disposed on either side of the motor assembly (16) along the longitudinal axis (X) and each having a rigid transmission coupling, with at least a first degree of freedom perpendicularly to the longitudinal axis (X), allowing the motor assembly (16) to move along a plane perpendicular to the longitudinal axis (X), the electromechanical actuator also comprising at least (Continued)

one elastic module (130) that limits the movement of the motor assembly (16) along the perpendicular plane.

22 Claims, 12 Drawing Sheets

(51) Int. Cl.
  *E06B 9/70* (2006.01)
  *F16D 3/04* (2006.01)
  *H02K 7/00* (2006.01)
  *E06B 9/264* (2006.01)

(56) References Cited

U.S. PATENT DOCUMENTS

| | | |
|---|---|---|
| 9,057,408 B2 | 6/2015 | Dupielet et al. |
| 11,136,820 B2 * | 10/2021 | Schuehmacher ... F16F 15/1207 |
| 2008/0102965 A1 | 5/2008 | Hsu |
| 2014/0206460 A1 | 7/2014 | Dupielet et al. |
| 2016/0124418 A1 * | 5/2016 | Lagarde .................. E06B 9/72 |
| | | 318/630 |
| 2018/0223595 A1 | 8/2018 | Anthony et al. |

FOREIGN PATENT DOCUMENTS

| | | |
|---|---|---|
| EP | 2733300 A1 | 5/2014 |
| EP | 3358121 A1 | 8/2018 |
| JP | H06-257359 A | 9/1994 |
| JP | 2003-176677 A | 6/2003 |
| WO | 2013007642 A1 | 1/2013 |

OTHER PUBLICATIONS

French Search Report and Written Opinion dated Jul. 15, 2019 in 1st priority application No. FR1859886; w/ English Tiachine translation (total 14 pages).

French Search Report and Written Opinion dated Sep. 17, 2019 in 2nd priority application No. FR1874064; w/ English Tiachine translation (total 16 pages).

* cited by examiner

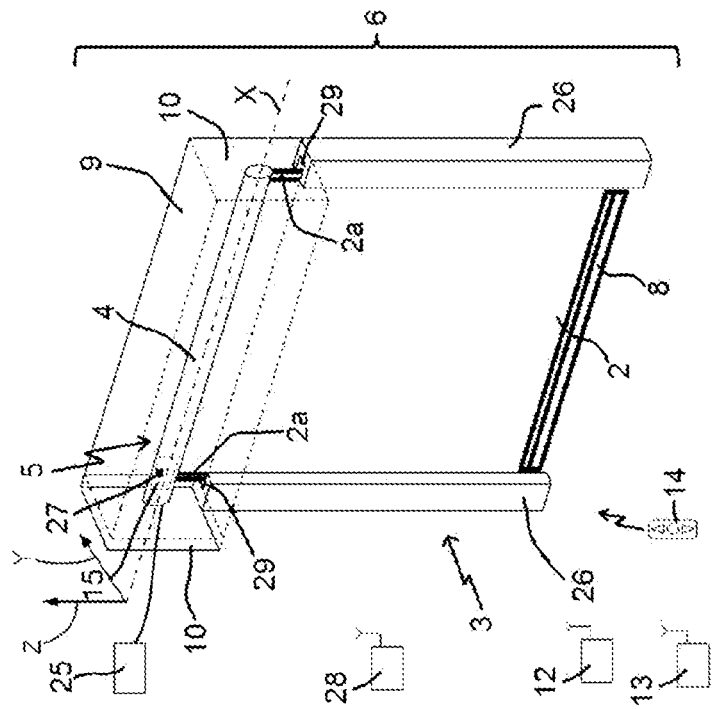
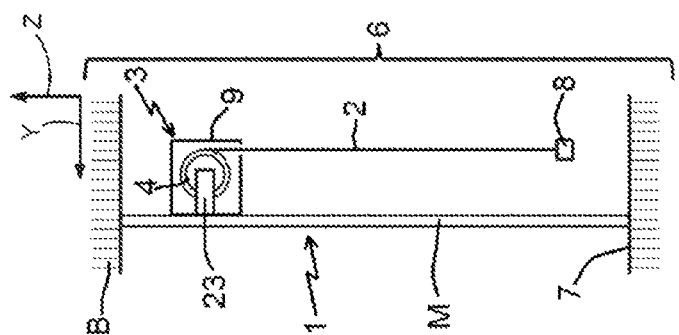

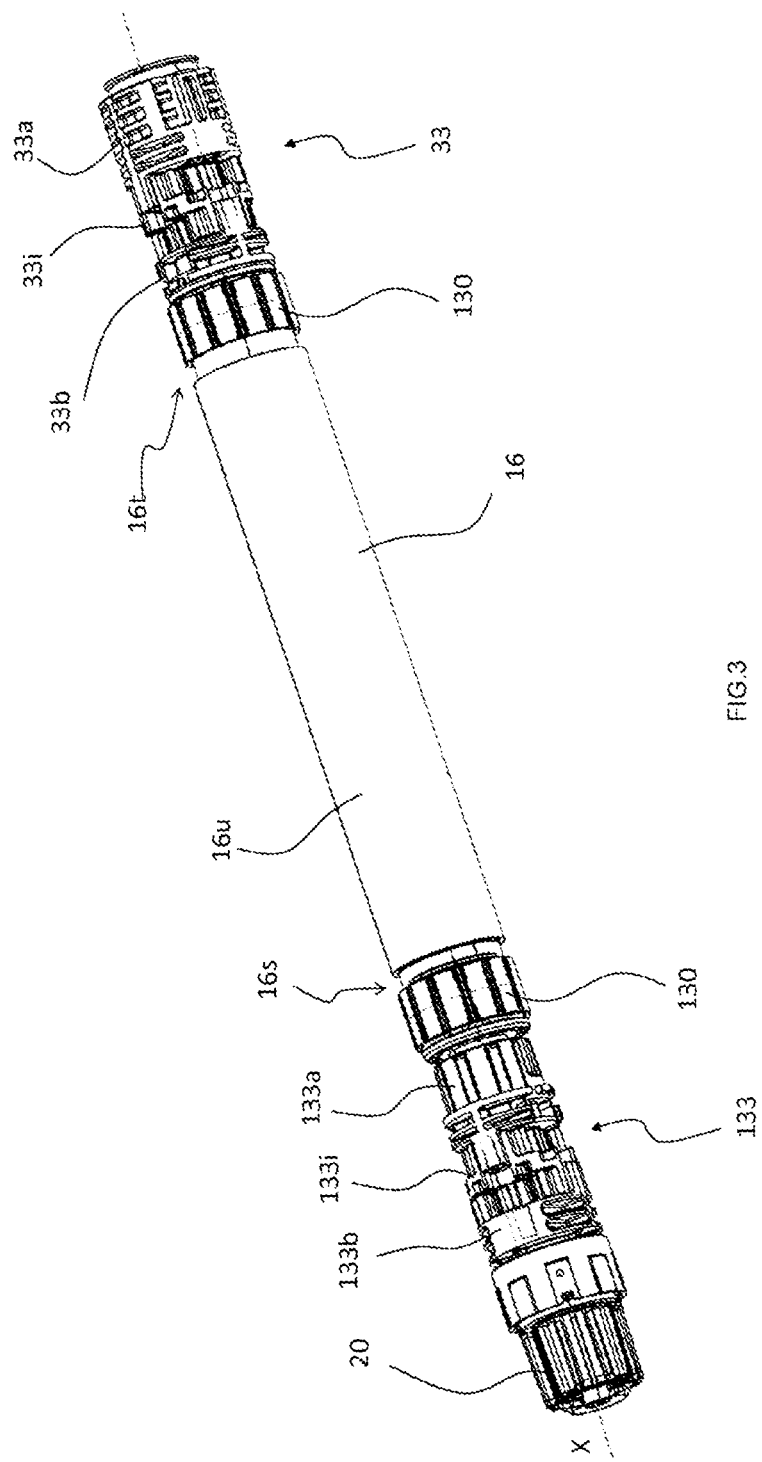

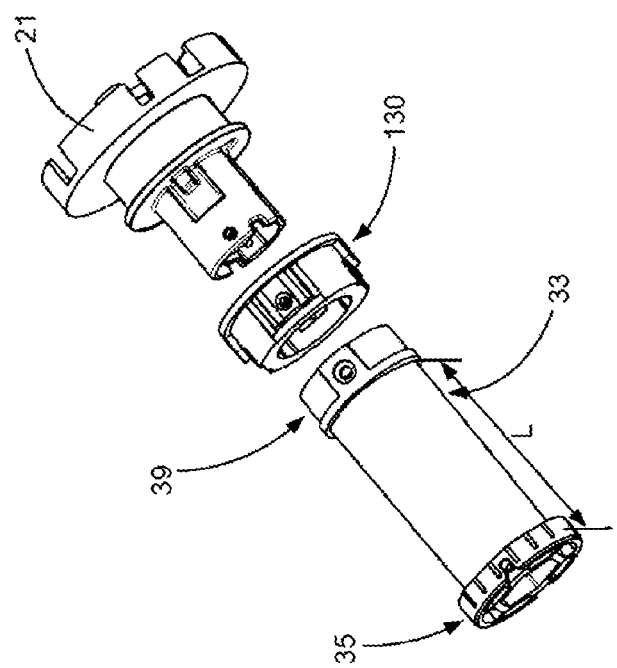

ELECTROMECHANICAL HOME-AUTOMATION ACTUATOR

The invention relates to an electromechanical actuator for a closure, privacy or solar protection installation, notably an actuator comprising an Oldham coupling. The invention relates also to an installation comprising such an electromechanical actuator.

Generally, the present invention relates to the field of closure, privacy or solar protection installations comprising a motorized driving device moving a screen, between at least one first position and at least one second position.

A motorized driving device comprises an electromechanical actuator of a movable closure, privacy or solar protection element such as a shutter, a door, a grid, a blind or any other equivalent equipment, hereinafter called "screen".

The electromechanical actuator is intended to be mounted inside a winding tube on which the screen is wound. Furthermore, the electromechanical actuator comprises at least an electric motor and a reduction gear. The electric motor and the reduction gear generate vibrations, during the operation of the electromechanical actuator. These vibrations are transmitted to the elements surrounding the electric motor, notably to a casing of the electromechanical actuator, to the winding tube and to the structure supporting the actuator.

Consequently, when operating the electromechanical actuator and in an assembled configuration of the electromechanical actuator in the installation, the electromechanical actuator generates noise.

The document EP 0 531 079 A1 is already known, describing vibration dampers mounted on either side of a driving motor of a winding tube for a closure or solar protection installation. These vibration dampers comprise an elastic coupling piece or a rubber disk, for example made of neoprene. Transmission shafts are mounted on either side of this elastic piece. Thus, the torque is transmitted through the elastic coupling piece, stressing the latter.

The elastic materials forming these torque transmission links are subjected to various phenomena which can affect their behavior over time, for example:
- the accommodation of the material or softening after several cycles,
- the stiffening due to the stressing frequency (notably in the case of vibrations),
- the internal heating of the material,
- the creep or relaxation of the structure: the viscous behavior of the elastomers causes a loss of rigidity of the material under the application of a static load,
- the fatigue of the material due to cyclic stresses.

One of the particular problems for solar protection installation actuators using couplings that use elastic pieces is that of creep or relaxation. Over time, in fact, there can be a deformation of these couplings which leads to an angular shift in position. These shifts can reach significant values which result in a visually perceptible shift between two solar protection screens placed side-by-side on a frontage.

The aim of the invention is to provide an actuator that remedies the drawbacks mentioned and that enhances the actuators known from the prior art. In particular, the invention proposes a simple actuator, that limits the transmission of the vibrations of the motor to the structure supporting it and that eliminates the problems of creep.

According to a first aspect of the invention, an electromechanical actuator for the closure, privacy or solar protection installation comprises a motor assembly, comprising an electric motor and a reduction gear, a first mechanical vibration filtering module, a second mechanical vibration filtering module and an output shaft, inserted at least partially into a casing of the electromechanical actuator, the electromechanical actuator extending along a longitudinal axis, the first and second mechanical vibration filtering modules being disposed on either side of the motor assembly along the longitudinal axis and each comprising a rigid transmission coupling, having at least one first degree of freedom perpendicular to the longitudinal axis of the electromechanical actuator, allowing a displacement of the motor assembly on a plane perpendicularly to the longitudinal axis of the electromechanical actuator, the electromechanical actuator further comprising at least one elastic module limiting the displacement of the motor assembly on the plane perpendicular to the longitudinal axis of the electromechanical actuator.

The elastic module limits the displacement of the motor assembly relatively to the casing on the plane perpendicular to the longitudinal axis of the actuator induced by the first degree of freedom of the first mechanical vibration filtering module and the second mechanical vibration filtering module, perpendicularly to the longitudinal axis of the actuator. In fact, because of the small differences in diameters of the motor assembly and of the casing, it is important to avoid having the motor assembly, under the effect of its own weight, come into contact with the casing of the actuator.

According to an advantageous embodiment, the first mechanical vibration filtering module comprises a first input piece mechanically linked directly or indirectly to a torque support, in particular linked to the casing, a first output piece mechanically linked directly or indirectly to the motor assembly and a first intermediate piece linked on one side to the first input piece and on the other side to the first output piece and having at least one degree of freedom in translation in a direction perpendicular to the longitudinal axis with respect to the first input piece and having at least one degree of freedom in translation in a direction perpendicular to the longitudinal axis with respect to the first output piece. Likewise, the second mechanical vibration filtering module comprises a second input piece mechanically linked directly or indirectly to a torque support, in particular linked to the casing, a second output piece mechanically linked directly or indirectly to the motor assembly and a second intermediate piece linked on one side to the second input piece and on the other side to the second output piece and having at least one degree of freedom in translation in a direction perpendicular to the longitudinal axis with respect to the second input piece and having at least one degree of freedom in translation in a direction perpendicular to the longitudinal axis with respect to the second output piece.

The first mechanical vibration filtering module thus ensures the mechanical link between the torque support, via the casing, and the motor assembly. The second mechanical vibration filtering module ensures the mechanical link between the motor assembly and the output shaft of the actuator. Thus, the actuator according to the invention uses the breaking capacity at least of the radial vibrations of the rigid transmission coupling with at least one degree of freedom to produce a rigid torsional vibro-acoustic filter and avoids the use of torsional elastic elements.

Advantageously, the first output piece of the first mechanical vibration filtering module comprises an external interface, comprising external splines, designed to be connected to the motor assembly.

Advantageously, the second input piece of the second mechanical vibration filtering module comprises an internal interface, provided with internal ribs, designed to be connected to an output shaft of the motor assembly.

According to an advantageous embodiment, the first and second intermediate pieces of the first mechanical vibration filtering module and of the second mechanical vibration filtering module are identical.

According to an advantageous embodiment, the first output piece of the first mechanical vibration filtering module is identical to the second input piece of the second mechanical vibration filtering module.

Advantageously, the rigid transmission coupling of the first and/or of the second mechanical vibration filtering module has a second degree of freedom parallel to the longitudinal axis of the actuator.

This notably allows the various pieces moving according to the first degree of freedom to be able to be freely displaced with respect to one another and ensure their vibration filtering function.

According to an advantageous embodiment, the first and/or the second mechanical vibration filtering module comprises an Oldham coupling or a Schmidt coupling or a tripod coupling.

Advantageously, the first mechanical vibration filtering module is hollow. This notably allows motor power supply cables to be run through the first mechanical vibration filtering module.

According to an advantageous embodiment, the elastic module comprises a bushing or a ring made of flexible material, notably of elastomer and/or viscoelastic material, disposed around the motor assembly.

The elastic module limits the possible radial displacement of the motor assembly with respect to the longitudinal axis of the electromechanical actuator, without however being torsionally stressed.

Advantageously, the elastic module comprises bosses forming its surface or surfaces in contact with the casing and/or the motor assembly.

Advantageously, the first mechanical vibration filtering module comprises at least a fixing element for fixing to the casing, notably at least one rib and/or at least one cavity.

The invention also relates to a closure, privacy or solar protection home-automation installation comprising a screen, a winding tube and an electromechanical actuator, the screen being able to be wound onto the winding tube driven in rotation by the electromechanical actuator, the electromechanical actuator comprising a motor assembly, comprising an electric motor and a reduction gear, a first mechanical vibration filtering module, a second mechanical vibration filtering module and an output shaft, inserted at least partially into a casing of the electromechanical actuator, the electromechanical actuator extending along a longitudinal axis, the first and second mechanical vibration filtering modules being disposed on either side of the motor assembly along the longitudinal axis and each comprising a rigid transmission coupling, having at least one first degree of freedom perpendicular to the longitudinal axis of the electromechanical actuator, allowing a displacement of the motor assembly on a plane perpendicularly to the longitudinal axis of the electromechanical actuator, the electromechanical actuator further comprising at least one elastic module limiting the displacement of the motor assembly on the plane perpendicular to the longitudinal axis of the electromechanical actuator.

According to the first aspect, objects of the invention are defined by the following definitions:

1. Electromechanical actuator for closure, privacy or solar protection installation, the electromechanical actuator comprising a motor assembly comprising an electric motor and reduction gear, a first mechanical vibration filtering module, a second mechanical vibration filtering module and an output shaft, inserted at least partially into a casing of the electromechanical actuator, the electromechanical actuator extending along a longitudinal axis, the first and second mechanical vibration filtering modules being disposed on either side of the motor assembly along the longitudinal axis and each comprising a rigid transmission coupling, having at least one first degree of freedom perpendicularly to the longitudinal axis of the electromechanical actuator, allowing a displacement of the motor assembly on a plane perpendicular to the longitudinal axis of the electromechanical actuator, the electromechanical actuator further comprising at least one elastic module limiting the displacement of the motor assembly on the plane perpendicular to the longitudinal axis of the electromechanical actuator.

2. Electromechanical actuator according to the definition 1, characterized in that the first mechanical vibration filtering module comprises a first input piece mechanically linked directly or indirectly to the torque support, in particular linked to the casing, a first output piece mechanically linked directly or indirectly to the motor assembly and a first intermediate piece linked on one side to the first input piece and on the other side to the first output piece and having at least one degree of freedom in translation in a direction perpendicular to the longitudinal axis with respect to the first input piece and having at least one degree of freedom in translation in a direction perpendicular to the longitudinal axis with respect to the first output piece, and in that the second mechanical vibration filtering module comprises a second input piece mechanically linked directly or indirectly to a torque support, in particular linked to the casing, a second output piece mechanically linked directly or indirectly to the motor assembly and a second intermediate piece linked on one side to the second input piece and on the other side to the second output piece and having at least one degree of freedom in translation in a direction perpendicular to the longitudinal axis with respect to the second input piece and having at least one degree of freedom in translation in a direction perpendicular to the longitudinal axis with respect to the second output piece.

3. Electromechanical actuator according to the definition 2, characterized in that the first output piece of the first mechanical vibration filtering module comprises an external interface, comprising external splines, designed to be connected to the motor assembly.

4. Electromechanical actuator according to the definition 3, characterized in that the second input piece of the second mechanical vibration filtering module comprises an internal interface, provided with internal ribs, designed to be connected to an output shaft of the motor assembly.

5. Electromechanical actuator according to one of the definitions 2 to 4, characterized in that the first and second intermediate pieces of the first mechanical vibration filtering module and of the second mechanical vibration filtering module are identical.

6. Electromechanical actuator according to one of the definitions 2 to 5, characterized in that the first output piece of the first mechanical vibration filtering module is identical to the second input piece of the second mechanical vibration filtering module.

7. Electromechanical actuator according to one of the definitions 1 to 6, characterized in that the rigid transmission coupling of the first and/or of the second mechanical vibration filtering module has a second degree of freedom parallel to the longitudinal axis of the actuator.

8. Electromechanical actuator according to one of the definitions 1 to 7, characterized in that the first and/or the second mechanical vibration filtering module comprises an Oldham coupling or a Schmidt coupling or a tripod coupling.

9. Electromechanical actuator according to one of the definitions 1 to 8, characterized in that the first mechanical vibration filtering module is hollow.

10. Electromechanical actuator according to one of the definitions 1 to 9, characterized in that the elastic module comprises a bushing or a ring made of flexible material, notably of elastomer and/or viscoelastic material, disposed around the motor assembly.

11. Electromechanical actuator according to the definition 10, characterized in that the elastic module comprises bosses forming its surface or surfaces in contact with the casing and/or the motor assembly.

12. Electromechanical actuator according to one of the definitions 1 to 11, characterized in that the first mechanical vibration filtering module comprises at least one fixing element for fixing to the casing, notably at least one rib and/or at least one cavity.

13. Closure, privacy or solar protection home-automation installation comprising a screen, a winding tube and an electromechanical actuator according to any one of the definitions 1 to 12, the screen being able to be wound onto the winding tube driven in rotation by the electromechanical actuator.

According to a second aspect of the invention, objects of the invention are defined by the following definitions:

14. Electromechanical actuator for closure, privacy or solar protection installation, the electromechanical actuator comprising, inserted at least partially into a casing of the electromechanical actuator:
a motor assembly, comprising an electric motor and a reduction gear,
an output shaft, and
at least one first mechanical vibration filtering module, the electromechanical actuator extending along a longitudinal axis, the first mechanical vibration filtering module being disposed along the longitudinal axis and comprising a rigid transmission coupling, having at least one first degree of freedom perpendicularly to the longitudinal axis of the electromechanical actuator, allowing a displacement of the motor assembly on a plane perpendicular to the longitudinal axis of the electromechanical actuator, the first mechanical vibration filtering module comprising:
an input piece,
an output piece,
an intermediate piece,
a first slide link, along a first axis, between the intermediate piece and the input piece,
a second slide link, along a second axis, between the intermediate piece and the output piece, the first axis and the second axis being perpendicular to the longitudinal axis of the electromechanical actuator,
first elements for limiting displacements, in translation on at least one of the first axis and the longitudinal axis, of the input piece relatively to the intermediate piece, and/or second elements for limiting displacements, in translation on at least one of the second axis and the longitudinal axis, of the output piece relatively to the intermediate piece.

15. Electromechanical actuator according to the definition 14, characterized in that the first displacement limiting elements comprise:

first tongues forming part of the input piece or of the intermediate piece, the first tongues extending mainly on the longitudinal axis, and
abutment surfaces forming part respectively of the intermediate piece or of the input piece, notably intended to cooperate by contact with the first tongues, in particular intended to cooperate by contact with first faces of the first tongues.

16. Electromechanical actuator according to one of the definitions 14 and 15, characterized in that the second displacement limiting elements comprise:
second tongues forming part of the output piece or of the intermediate piece, the second tongues extending mainly on the longitudinal axis, and
abutment surfaces forming part respectively of the intermediate piece or of the output piece, notably intended to cooperate by contact with the second tongues, in particular intended to cooperate by contact with second faces of the second tongues.

17. Electromechanical actuator according to one of the definitions 15 and 16, characterized in that each first tongue comprises at least one first flexible part, notably a first flexible arm or two first flexible arms and/or in that each second tongue comprises at least one second flexible part, one second flexible arm or two second flexible arms.

18. Electromechanical actuator according to the definition 17, characterized in that each first tongue comprises at least one first inclined end face and/or in that each second tongue comprises at least one second inclined end face.

19. Electromechanical actuator according to one of the definitions 14 to 18, characterized in that the electromechanical actuator further comprises at least one elastic module limiting the displacement of the motor assembly on the plane perpendicular to the longitudinal axis of the electromechanical actuator.

20. Electromechanical actuator according to the definition 19, characterized in that the elastic module comprises a bushing or a ring made of flexible material, notably made of elastomer and/or viscoelastic material, disposed around the motor assembly.

21. Electromechanical actuator according to the definition 20, characterized in that the elastic module comprises bosses forming its surface or surfaces in contact with the casing and/or the motor assembly.

22. Electromechanical actuator according to one of the definitions 14 to 21, characterized in that the input piece of the first mechanical vibration filtering module is mechanically linked directly or indirectly to a torque support, in particular linked to the casing, and the output piece is mechanically linked directly or indirectly to the motor assembly.

23. Electromechanical actuator according to one of the definitions 14 to 22, characterized in that it comprises a second mechanical vibration filtering module, the first and the second mechanical vibration filtering modules being disposed on either side of the motor assembly along the longitudinal axis.

24. Electromechanical actuator according to the definition 23, characterized in that the second mechanical vibration filtering module comprises
an input piece,
an output piece,
an intermediate piece,
a first slide link, along a first axis, between the intermediate piece and the input piece,
a second slide link, along a second axis, between the intermediate piece and the output piece, the first axis and the second axis being perpendicular to the longitudinal axis of the electromechanical actuator, first elements for limiting displacements, in translation along at least one of the first axis and the longitudinal axis, of the input piece relatively to the intermediate piece and/or second elements for limiting displacements, in translation along at least one of the first axis and the longitudinal axis, of the output piece relatively to the intermediate piece.

25. Electromechanical actuator according to one of the definitions 14 to 24, further comprising a vibration absorption module and a torque support, inserted at least partially into the casing, the input piece of the first mechanical vibration filtering module being mechanically linked directly or indirectly to the casing, the output piece of the first mechanical vibration filtering module being mechanically linked to the torque support, the mechanical vibration filtering module ensuring the mechanical link between the casing and the torque support in rotation about the longitudinal axis of the actuator, the vibration absorption module mechanically linking the casing to the torque support in translation perpendicularly to the longitudinal axis of the actuator while allowing a degree of freedom in rotation between the casing and the torque support about the longitudinal axis.

26. Actuator according to the definition 25, characterized in that the vibration absorption module comprises a first bushing made of flexible material, notably made of elastomer and/or viscoelastic material, disposed around a part of the torque support and a second bushing made of rigid material, disposed around the first bushing or inserted into the first bushing.

27. Closure, privacy or solar protection home-automation installation comprising a screen, a winding tube and an electromechanical actuator according to any one of the preceding definitions 14 to 26, the screen being able to be wound onto the winding tube driven in rotation by the electromechanical actuator.

Excluding logical or technical incompatibility, any combination of features of an object according to the first aspect of the invention and of features of an object according to the second aspect of the invention can be envisaged.

Moreover, according to another aspect, an actuator according to the invention is defined by claim 1.

Different embodiments of an actuator are defined by claims 2 to 21.

According to this other aspect, an installation according to the invention is defined by claim 22.

The invention will be better understood on reading the following description, given purely as an example and with reference to the attached drawings in which:

FIG. 1 is a cross-sectional schematic view of a conformal installation according to an embodiment;

FIG. 2 is a perspective schematic view of the installation illustrated in FIG. 1;

FIG. 3 is a partial view of an embodiment of an electromechanical actuator of the installation illustrated in FIGS. 1 and 2;

FIG. 13 is another exploded perspective view of this other embodiment.

Figure 4:
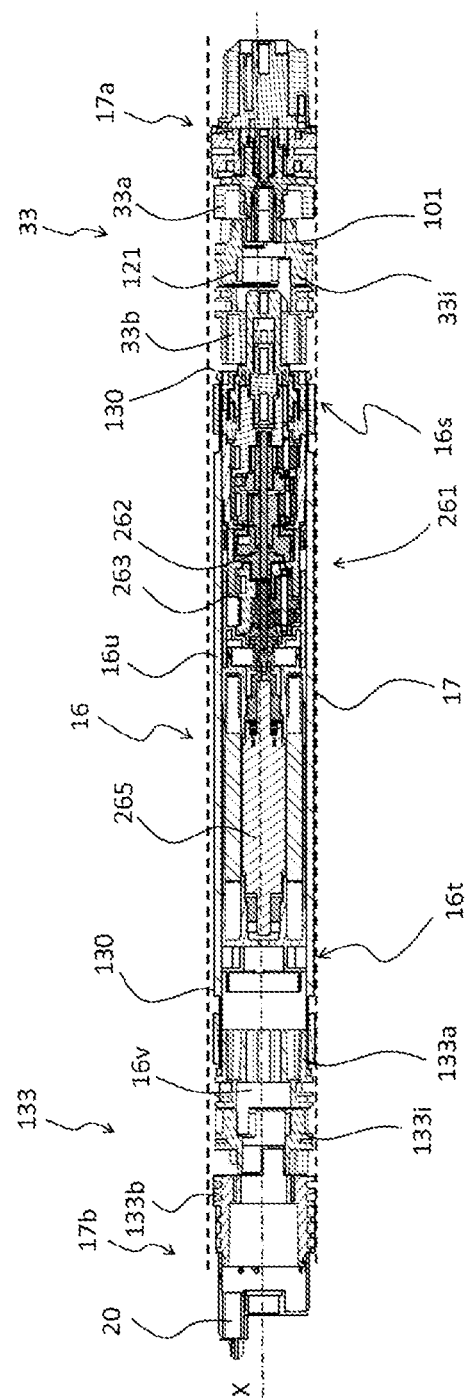
FIG. 4 is a longitudinal cross-sectional view of an embodiment of the electromechanical actuator illustrated in FIG. 3.

First to be described, with reference to FIGS. 1 and 2, is an embodiment of an installation 6. This installation equips a building B comprising an opening 1, notably a window or a door. The installation 6 comprises a closure, privacy or solar protection device 3, in particular a motorized blind. The device 3 comprises a screen 2.

The device 3 can be a blind, notably a fabric, that can be wound, a folded blind or a slatted blind. The device 3 can also be a roller blind or even a rolling door. The device 3 can even be of any other type.

Also described, with reference to FIGS. 1 and 2, is an embodiment of the device 3 in the form of a windable motorized blind 3.

The device 3 comprises a winding tube 4 and a motorized driving device 5 comprising an electromechanical actuator 11.

The screen 2 of the device 3 is wound onto the winding tube 4 driven by the motorized driving device 5. Thus, the screen is movable between a wound position, in particular a high position, and an unwound position, in particular a low position.

The screen 2 of the device 3 is a closure, a privacy and/or solar protection screen that is wound and unwound around the winding tube 4, whose internal diameter is substantially greater than the outer diameter of the electromechanical actuator 11, such that the electromechanical actuator 11 can be inserted into the winding tube 4, when the device 3 is assembled.

The device 3 comprises a holding device 9, 23. For example, the holding device 9, 23 can comprise two accessories 23. An accessory 23 is disposed at each end of the winding tube 4, in an assembled configuration of the device 3. Thus, the winding tube 4 is held via the accessories 23. Just one of the accessories 23 is represented in FIG. 1. The accessories 23 allow the device 3 to be mechanically linked to the structure of the building B, notably to a wall M of the building B. The holding device 9, 23 can comprise a box 9. Furthermore, the winding tube 4 and at least a part of the screen 2 are housed inside the box 9, in the assembled configuration of the device 3. Generally, the box 9 is disposed above the opening 1, or even in the upper part of the opening 1. As illustrated in FIG. 1, the accessories 23 are preferably also housed inside the box 9. In a variant, represented in FIG. 2, the winding tube 4 is held via the box 9, in particular via side plates 10 of the box 9.

The device 3 can also comprise two lateral runners 26, as illustrated in FIG. 2. Each lateral runner 26 comprises a groove 29. Each groove 29 of one of the lateral runners 26 cooperates, in other words is configured to cooperate, with a lateral edge 2a of the screen 2, in the assembled configuration of the device 3, so as to guide the screen 2, during the winding and the unwinding of the screen 2 around the winding tube 4.

The electromechanical actuator 11 is, for example, of tubular type. It allows the winding tube 4 to be rotated about its longitudinal axis X so as to wind or unwind the screen 2 of the device 3. In the mounted state, the electromechanical actuator 11 is inserted into the winding tube 4.

The device 3 also comprises a load bar 8 for exerting a tension on the screen 2, for example to exert a weight on the screen 2.

The windable blind, which forms the device 3, comprises a fabric, forming the screen 2 of the windable blind 3. A first end of the screen 2, in particular the top end of the screen 2, in the assembled configuration of the device 3, is fixed to the winding tube 4. Furthermore, a second end of the screen 2, in particular the bottom end of the screen 2, in the assembled configuration of the device 3, is fixed to the load bar 8. For example, the fabric forming the screen 2 is produced from a textile material. In an exemplary embodiment, not represented, the first end of the screen 2 has a hem through which a rod is positioned, in particular made of plastic material. This hem produced at the first end of the screen 2 is obtained by means of a stitching of the fabric forming the screen 2. During the assembly of the screen 2 on the winding tube 4, the hem and the rod situated at the first end of the screen 2 are slidingly inserted into a groove formed on the outer face of the winding tube 4, in particular over the entire length of the winding tube 4, so as to be able to wind and unwind the screen 2 around the winding tube 4.

In the case of a windable blind, the wound high position corresponds to a predetermined high end-of-travel position, or even to the bearing of the load bar 8 of the screen 2 against an edge of a box 9 of the windable blind 3, and the unwound low position corresponds to a predetermined low end-of-travel position, or to the bearing of the load bar 8 of the screen 2 against a sill 7 of the opening 1, or even to the complete unwinding of the screen 2.

Advantageously, the motorized driving device 5 is controlled by a control unit. The control unit can be, for example, a local control unit 12 or a central control unit 13.

Advantageously, the local control unit 12 can be linked by wired or wireless link with the central control unit 13.

Advantageously, the central control unit 13 can drive the local control unit 12, and other similar local control units distributed in the building.

Advantageously, the central control unit 13 can be in communication with a weather station disposed inside the building B or remotely located outside the building B, including, notably, one or more sensors that can be configured to determine, for example, a temperature, a brightness, or even a wind velocity, in the case where the weather station is remotely located outside the building B.

A remote control 14, that can be of a local control unit type, and provided with a control keypad, which comprises selection and display elements, also allows a user to intervene on the electromechanical actuator 11 and/or the central control unit 13.

The motorized driving device 5 is, preferably, configured to execute commands for unwinding or winding the screen 2 of the device 3, that can be sent, notably, by the local control unit 12, the central control unit 13 or the remote control 14.

Now, an embodiment of the electromechanical actuator 11 of FIGS. 1 and 2 is described in more detail and with reference to FIGS. 3 and 4.

The electromechanical actuator 11 comprises a motor assembly 16, comprising an electric motor 261. The electric motor comprises a rotor 262 and a stator 263, positioned coaxially about a longitudinal axis X, which is also the axis of rotation of the winding tube 4 in the mounted configuration of the motorized driving device 5. The motor assembly also comprises a reduction gear 265. Advantageously, the reduction gear 265 comprises at least one reduction stage. The reduction stage can be a gear train of epicyclic type. The type and the number of reduction stages of the reduction gear are nonlimiting. The motor assembly also comprises a tube 16u in which the electric motor 261 and the reduction gear 265 are housed.

Advantageously, the electromechanical actuator 11 also comprises a brake that is not represented. Nonlimiting examples include a brake that can be a spring-operated brake, a cam-operated brake or a magnetic or electromagnetic brake. The brake can also form part of the motor assembly 16 and be housed in the tube 16u of the motor assembly 16.

Advantageously, the motor assembly and possibly the brake are disposed inside a casing 17 of the electromechanical actuator 11, the casing 17 being represented schematically by dotted lines in FIG. 4. The casing 17 or housing of the electromechanical actuator 11 is of cylindrical form, notably of revolution. In one embodiment, the casing 17 is produced in a metal material, but the material of the casing of the electromechanical actuator is nonlimiting and can be different. It can be, in particular, a plastic material.

Advantageously, the electromechanical actuator 11 comprises an output shaft 20, driven in rotation by the motor assembly 16.

Figure 8:
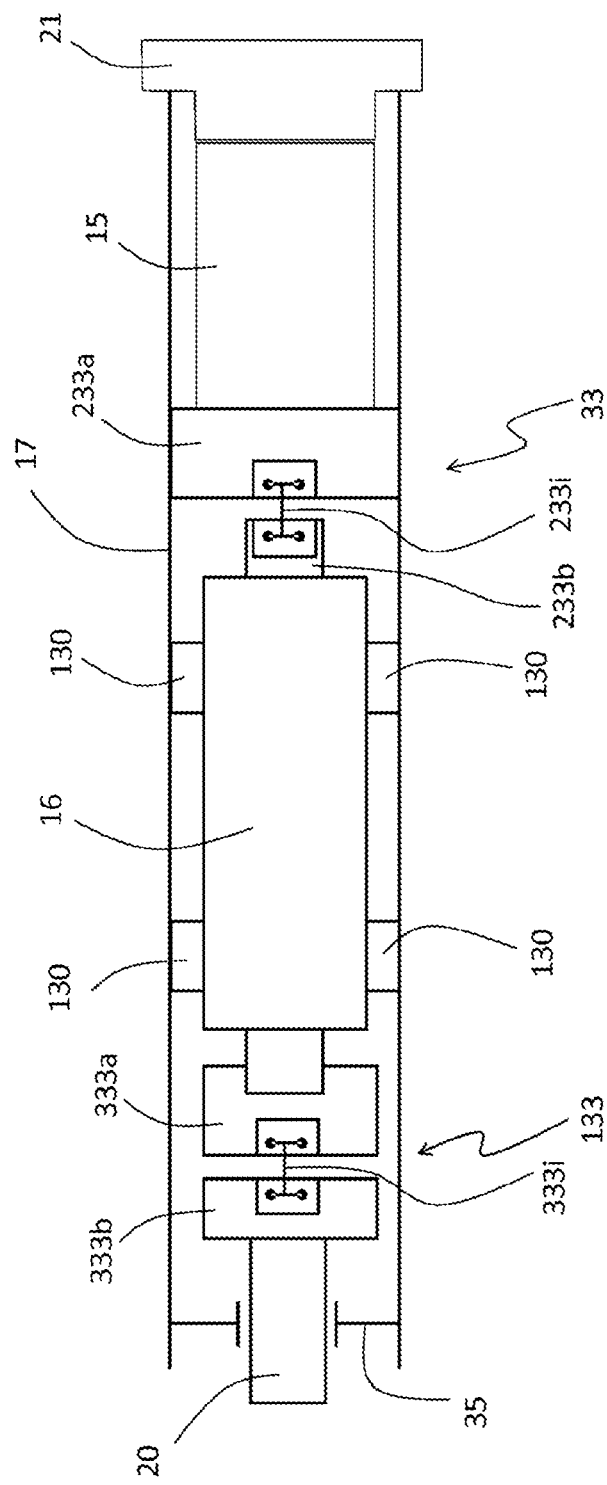
FIG. 8 is a schematic view of an electromechanical actuator of the installation illustrated in FIGS. 1 and 2 according to a second embodiment.

Control means of the electromechanical actuator 11, allowing the displacement of the screen 2 of the device 3, comprise at least one electronic control unit 15, represented schematically in FIG. 8. This electronic control unit 15 can start up the motor assembly 16 of the electromechanical actuator 11, and, in particular, allow the electric motor 261 of the motor assembly 16 to be supplied with electrical power.

Thus, the electronic control unit 15 controls notably the power supply of the electric motor of the motor assembly 16, so as to open, notably wind, or close, notably unwind, the screen 2, as described previously.

The electronic control unit 15 also comprises a communication module 27, as illustrated in FIG. 2, in particular for receiving control commands. The control commands are sent by a command transmitter, such as the remote control 14 intended to control the electromechanical actuator 11 or one of local 12 or central 13 control units.

Preferentially, the communication module 27 of the electronic control unit 15 is of wireless type. In particular, the communication module 27 is configured to receive radiofrequency control commands.

The communication module 27 can also allow reception of control commands transmitted by wired means.

The central control unit 13, the local control unit 12 or the electronic control unit 15 can also be in communication with a server 28, as illustrated in FIG. 2, so as to control the electromechanical actuator 11 according to data made available remotely via a communication network, in particular an internet network that can be linked to the server 28.

The control means of the electromechanical actuator 11 comprise hardware and/or software means. As a nonlimiting example, the hardware means can comprise at least one microcontroller, configured to manage the operation of the control unit and the operation of the electric motor. Advantageously, the electronic control unit 15 is configured to control the electric motor of the motor assembly 16. The electronic control unit 15 can thus comprise an electronic circuit board, which can notably support one or more pushbuttons, one or more light-emitting diodes, and, for example, programming input-output contacts. The electromechanical actuator 11 can also comprise an end-of-travel and/or obstacle detection device, that can be mechanical or electronic.

Advantageously, the electromechanical actuator 11 is supplied with electrical power. The electromechanical actuator 11 comprises an electrical power supply cable allowing it to be supplied with electrical energy, from an external source such as the mains supply or from a battery or a charger. Advantageously, the electronic control unit 15 and the motor 16 can be supplied with electrical power by means of the electrical power supply cable 18. Alternatively, the electromechanical actuator 11 incorporates a battery, that can be a replaceable battery or that can be rechargeable via the electrical cable.

Advantageously, the electromechanical actuator 11 comprises a torque support 21 (or actuator head) represented schematically in FIG. 8. The torque support 21 is disposed at one end of the casing 17 of the electromechanical actuator 11, in an assembled configuration of the electromechanical actuator 11. The torque support 21 makes it possible to take up the forces exerted by the electromechanical actuator 11 and ensure the taking up of the forces exerted by the actuator, in particular the torque exerted by the electromechanical actuator 11, by the structure of the building B. The torque support 21 advantageously makes it possible to also take up the forces exerted by the winding tube, notably the weight of the winding tube, of the electromechanical actuator and of the screen, and ensure the taking up of these forces by the structure of the building B. The torque support 21 of the electromechanical actuator 11 can also be used to close one end of the casing 17 of the electromechanical actuator 11. Moreover, the torque support 21 of the electromechanical actuator 11 can be used to support at least a part of the electronic control unit.

Thus, the torque support 21 of the electromechanical actuator 11 allows the electromechanical actuator 11 to be fixed onto the holding device 9, 23, in particular to one of the accessories 23 or to one of the cheek plates 10 of the box 9.

Advantageously, the torque support 21 protrudes at the end of the casing 17 of the electromechanical actuator 11.

The winding tube 4 of the device 3 is driven in rotation about the axis of rotation X and of the casing 17 of the electromechanical actuator 11 by being supported via two pivot links. The first pivot link is produced at a first end of the winding tube 4 by means of a crown ring, not represented, inserted around one end of the casing 17 of the electromechanical actuator 11, close to the torque support 21. The crown ring thus makes it possible to achieve a bearing. The second pivot link, not represented, is produced at a second end of the winding tube 4.

The output shaft 20 of the electromechanical actuator 11 is disposed at least partly outside the casing 17 of the electromechanical actuator 11. Here, one end of the output shaft 20 protrudes with respect to the casing 17 of the electromechanical actuator 11, in particular with respect to a second end 17b of the casing 17 opposite the first end 17a. The output shaft 20 of the electromechanical actuator 11 is configured to rotationally drive a link element, not represented, linked to the winding tube 4. The link element is produced in the form of a wheel. When the electromechanical actuator 11 is operated, the motor assembly 16, notably the electric motor and the reduction gear, drive the output shaft 20 in rotation. The output shaft 20 of the electromechanical actuator 11 drives the winding tube 4 in rotation via the link element. Thus, the winding tube 4 drives the screen 2 of the device 3 in rotation, so as to wind or unwind the screen 2 and thus leave the opening 1 free or blacked out.

Figure 5:
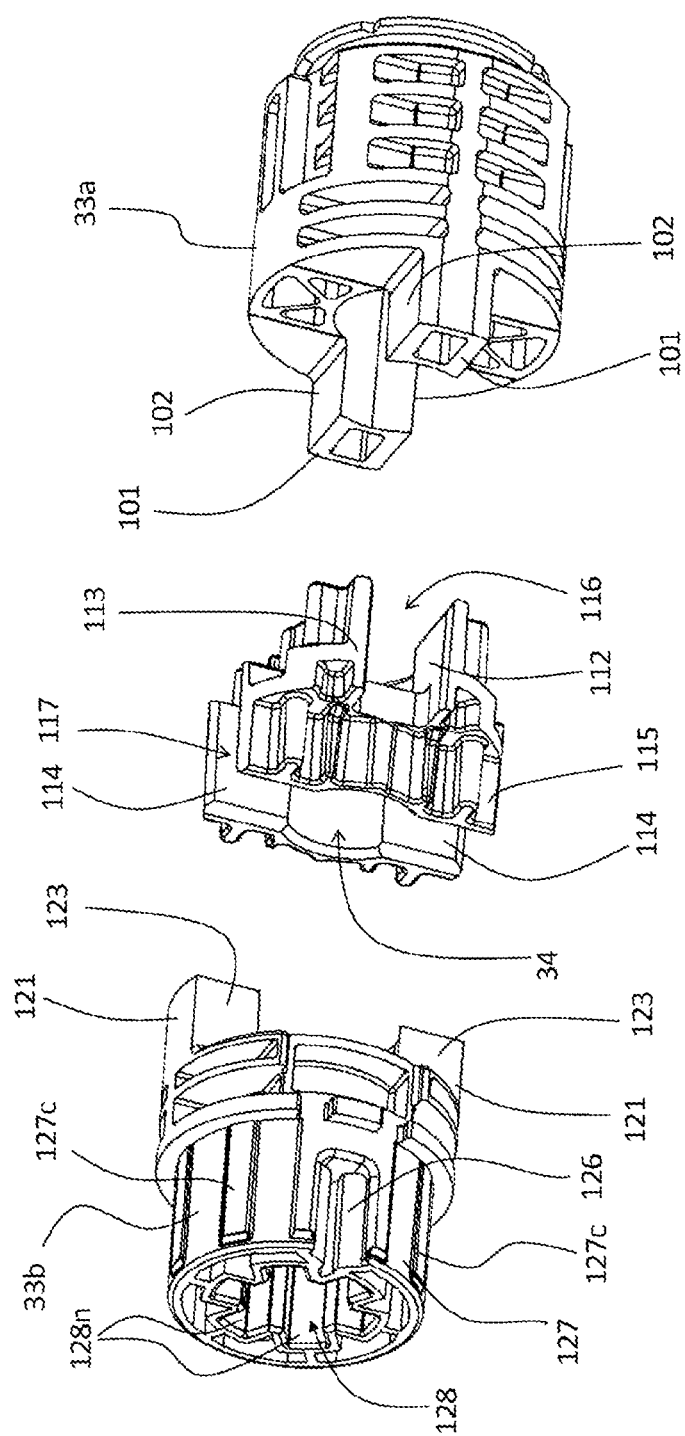
FIG. 5 is an exploded view according to a first perspective of an embodiment of a first mechanical vibration filtering module of the electromechanical actuator illustrated in FIGS. 3 and 4.
Figure 6:
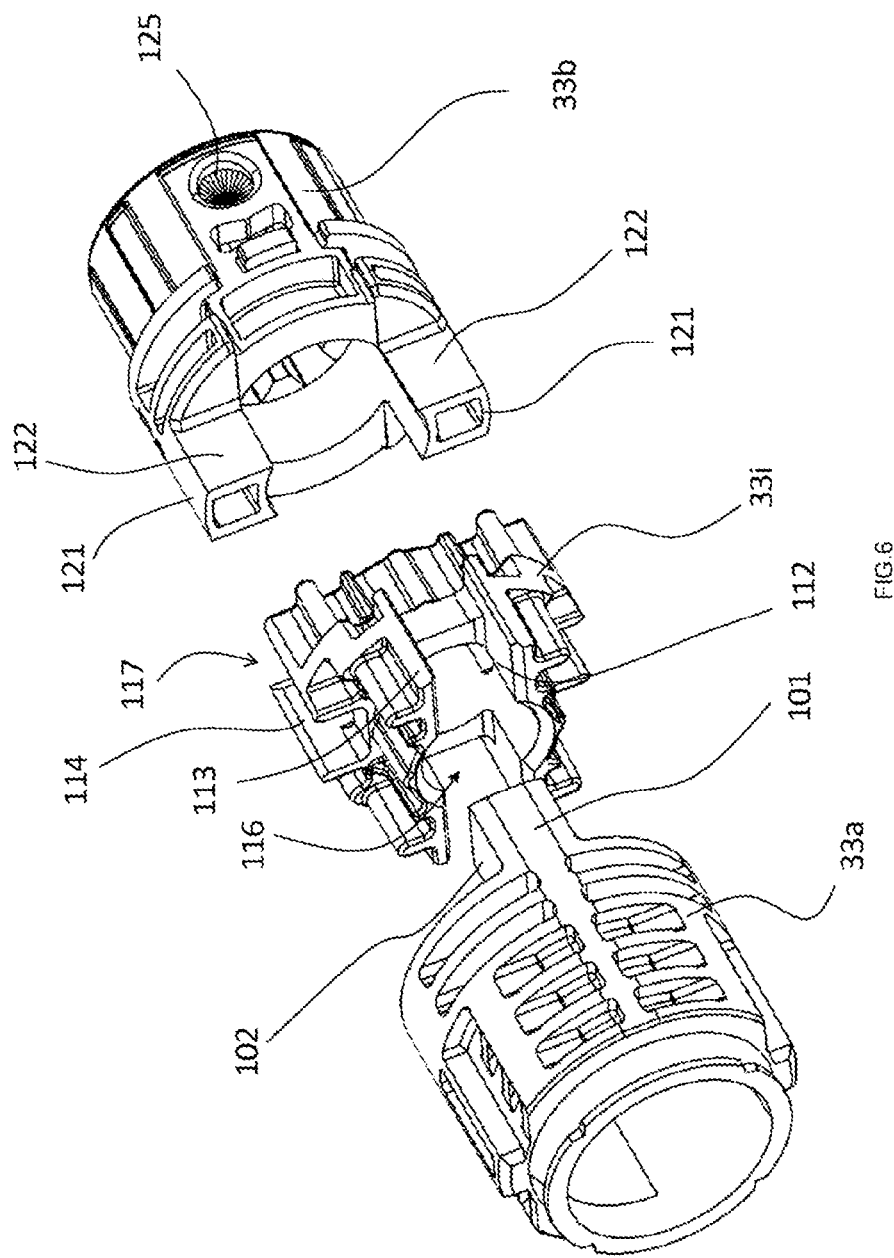
FIG. 6 is an exploded view according to a second perspective of the first mechanical vibration filtering module illustrated in FIG. 5.
Figure 7:
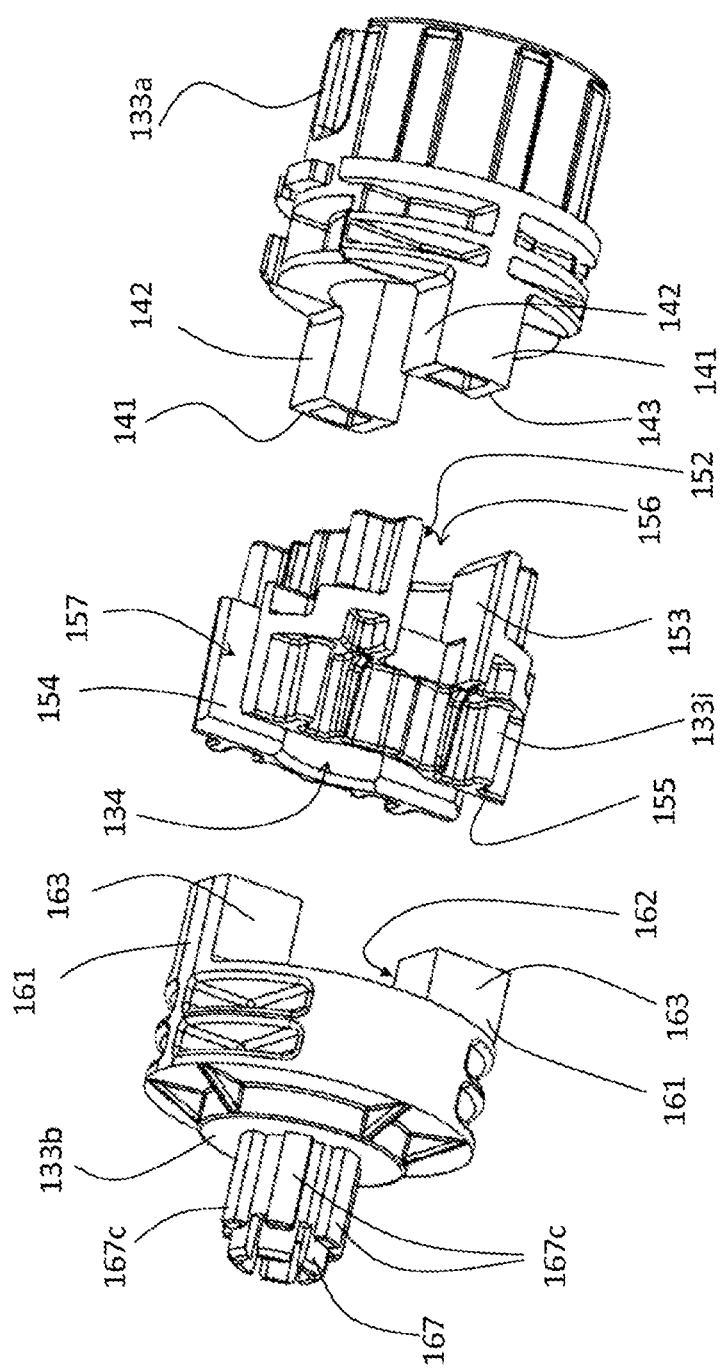
FIG. 7 is an exploded view according to a first perspective of an embodiment of a second mechanical vibration filtering module of the electromechanical actuator illustrated in FIGS. 3 and 4.

The electromechanical actuator 11 comprises, in addition to the motor assembly 16, the torque support 21 and the casing 17, a first mechanical vibration filtering module 33 and a second vibration filtering module 133. The first mechanical vibration filtering module 33 mechanically links the torque support 21, through the casing 17, and the motor assembly 16, at least in rotation about the axis X of the electromechanical actuator. For that, the first mechanical vibration filtering module 33 comprises an input piece 33a mechanically linked directly or indirectly to the casing, notably fully linked or at least linked by a link preventing the rotation about the axis X. The first mechanical vibration filtering module 33 comprises an output piece 33b mechanically linked directly or indirectly to the motor assembly 16, notably fully linked or at least linked by a link preventing the rotation about the axis X. The input 33a or output 33b pieces can be linked respectively to the casing or to the motor assembly 16 by a ball-peening method, that is to say by a deformation of the casing, respectively of the tube 16u of the motor assembly, onto a fixing element, such as a cavity 125, represented in FIGS. 6, 9 and 10 or a rib 126, visible in FIG. 5, such that the deformed casing cooperates with the cavity 125 to block rotationally, and preferably also translationally, the movement of the input piece 33a with respect to the casing 17 or of the output piece 33b with respect to the motor assembly 16. The first mechanical vibration filtering module 33 also comprises an intermediate piece 33i linked on one side to the input piece 33a and on the other side to the output piece 33b. These pieces will be explained in detail hereinbelow.

The second mechanical vibration filtering module 133 comprises an input piece 133a mechanically linked directly or indirectly to the motor assembly 16, notably fully linked or linked at least by a link preventing the rotation about the axis X. The second mechanical vibration filtering module 133 comprises an output piece mechanically linked directly or indirectly to the output shaft 20 of the electromechanical actuator 11, notably fully linked or linked at least by a link preventing the rotation about the axis X. The second mechanical vibration filtering module 133 also comprises an intermediate piece 133i linked on one side to the input piece 133a and on the other side to the output piece 133b.

The first and second mechanical vibration filtering modules are disposed on either side of the motor assembly 16 along the longitudinal axis X. In other words, the first and second mechanical vibration filtering modules are at the two ends of the motor assembly 16, relatively to the longitudinal axis X.

The first and second mechanical vibration filtering modules each comprise a rigid transmission coupling, having at least one first degree of freedom perpendicularly to the longitudinal axis X of the actuator.

The electromechanical actuator 11 also comprises one or more elastic modules 130 or, otherwise stated, one or more vibration absorption modules 130, limiting the displacement of the motor assembly relatively to the casing 17 according to the first degree of freedom. Each elastic module 130 thus forms a deformable link between the motor assembly 16 and the casing 17, in particular on the axis Z perpendicular to the longitudinal axis X. Preferably, the elastic module 130 is independent and forms an entity separate from the first or second mechanical vibration filtering module 33, 133. Alternatively, a first elastic module 130 can be provided on the output piece 33*b* of the first mechanical vibration filtering module 33 and/or on the motor assembly 16 and/or a second elastic module 130 can be provided on the input piece 133*a* of the second mechanical vibration filtering module 133 and/or on the motor assembly 16.

Thus, the mechanical vibration filtering modules 33, 133 make it possible to transmit mainly, even exclusively, the torques about the axis X of the electric motor and/or of the casing to the torque support and ensure a break to the transmission of the radial and axial vibrations.

For this, the mechanical vibration filtering module has, primarily, a torsional rigidity about the axis X between its first end and its second end. Its rigidity to other stresses (traction, compression, bending) regardless of the direction and torsion in the directions Y or Z perpendicular to the direction X are much lower, even zero. These low rigidities to the other stresses allow the mechanical vibration filtering module to transmit very little vibration of traction-compression type regardless of the direction of these vibrations. These low rigidities to the other stresses also allow the mechanical vibration filtering module to transmit very little vibration of torsion type whose direction is perpendicular to the axis X. This makes it possible to optimize the physical characteristics of the mechanical vibration filtering module for a good filtering of the vibrations with no constraint other than a mechanical resistance to torsion about the axis X.

In a first embodiment, illustrated in FIGS. 3 to 7, the first and/or the second mechanical vibration filtering module can comprise an Oldham coupling, notably as rigid coupling. For example, the first mechanical vibration filtering module 33 is such that the intermediate piece 33*i* is linked to the input piece 33*a* by a first slide link 116 and is linked to the output piece 33*b*, by a second slide link 117, the first and second slide links 116, 117 having axes that are not mutually parallel, notably axes that are perpendicular to one another. The first and second slide links 116, 117 have their axes perpendicular to the axis X.

These slide links 116, 117 ensure a degree of freedom radially with respect to the axis X, which allows the Oldham coupling to cut the transmission of the vibrations in the plane perpendicular to the axis X, in the directions or axes Y (perpendicular to X) and Z (perpendicular to X and Y).

The slide links 116, 117 are formed notably by inner walls 112, 113, 114, 115 formed in the intermediate piece 33*i*. Protrusions 101 of the input piece 33*a* extending parallel to the longitudinal axis X and having contact surfaces 102, 103, cooperating with the inner walls 112, 113 of the intermediate piece 33*i*, ensure the translation of the intermediate piece 33*i* with respect to the input piece 33*a*, on the first axis Y. Protrusions 121 of the output piece 133*b* extending parallel to the longitudinal axis X and having contact surfaces 122, 123, cooperating with the inner walls 114, 115 of the intermediate piece 33*i*, ensure the translation of the intermediate piece 33*i* with respect to the output piece 33*b*, on the second axis Z.

The output piece 33*b* comprises an external interface 127, comprising external splines 127*c*, designed to be connected to the motor assembly 16. For example, the outer splines 127*c* cooperate with the interior of the tube 16*u* of the motor assembly to form a rotationally-fixed link between the output piece 33*b* and the motor assembly. The output piece 33*b* also comprises an internal interface 128, provided with internal ribs 128*n*.

Advantageously, the input 33*a*, intermediate 33*i* and output 33*b* pieces are hollow, leaving a central opening 34 free for the passage of motor power supply cables through the first mechanical vibration filtering module 33.

In an equivalent manner, the second mechanical vibration filtering module 133 is such that the intermediate piece 133*i* is linked to the input piece 133*a* by a third slide link 156 and is linked to the output piece 133*b* by a fourth slide link 157, the third and fourth slide links 156, 157 having axes that are not parallel to one another, notably having axes perpendicular to one another. The third and fourth slide links 156, 157 have their axes perpendicular to the axis X.

These slide links 156, 157 ensure a degree of freedom radially with respect to the axis X, which allows the Oldham coupling to cut the transmission of the vibrations in the plane perpendicular to the axis X, in the directions or axes Y (perpendicular to X) and Z (perpendicular to X and Y).

The slide links 156, 157 are formed notably by inner walls 152, 153, 154, 155 formed in the intermediate piece 133*i*. Protrusions 141 of the input piece 133*a* extending parallel to the longitudinal axis X and having contact surfaces 142, 143, cooperating with the inner walls 152, 153 of the intermediate piece 133*i*, ensure the translation of the intermediate piece 133*i* with respect to the input piece 133*a*, on the first axis Y. Protrusions 121 of the output piece 133*b* extending parallel to the longitudinal axis X and having contact surfaces 162, 163, cooperating with the inner walls 154, 155 of the intermediate piece 133*i*, ensure the translation of the intermediate piece 133*i* with respect to the output piece 133*b*, on the second axis Z.

The output piece 133*b* comprises an output interface 167, comprising external splines 167*c*, designed to be connected to the output shaft 20. For example, external splines 167*c* cooperate with a hollow shaft of the output shaft to form a rotationally fixed link between the output piece 33*b* and the output shaft 20.

Advantageously, the intermediate pieces 33*i* and 133*i* are identical. Likewise, the output piece 33*b* of the first mechanical vibration filtering module 33 is identical to the input piece 133*a* of the second mechanical vibration filtering module 133. Thus, an internal interface 128 of the input piece 133*b*, identical to the internal interface 128 of the output piece 33*b* of the first mechanical vibration filtering module 33 and visible in FIG. 5, makes it possible to ensure a link with an output shaft 16*v* of the motor assembly 16, provided with pleats cooperating with the internal ribs 128*n*.

In the case where the electromechanical actuator comprises two Oldham couplings, the axes of the slides of the two couplings are not necessarily parallel.

The axes of the slides of one and the same Oldham coupling are not necessarily perpendicular.

In the Oldham couplings described previously, the grooves and the protrusions could be reversed: the grooves could be located on the input and output pieces and the protrusions could be located on the intermediate pieces.

In the Oldham couplings, the input and/or output and/or intermediate pieces can be made of plastic material (polymer or polyamide) or of metal.

Figure 9:
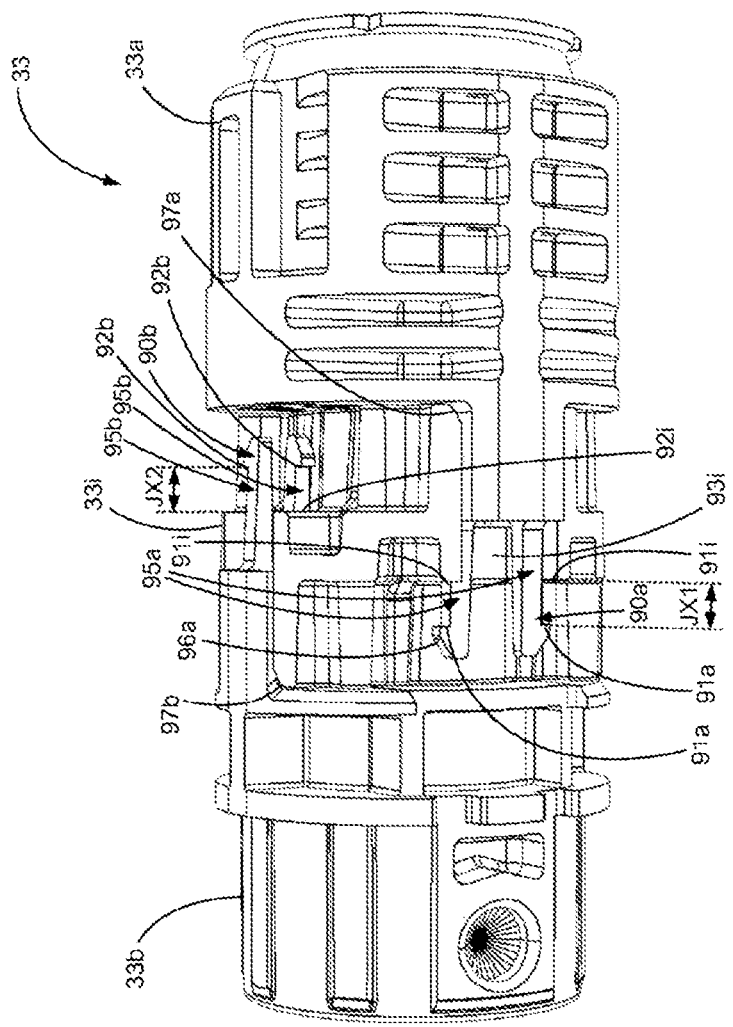
FIG. 9 is another perspective assembled view of the first mechanical vibration filtering module illustrated in FIGS. 5 and 6.
Figure 10:
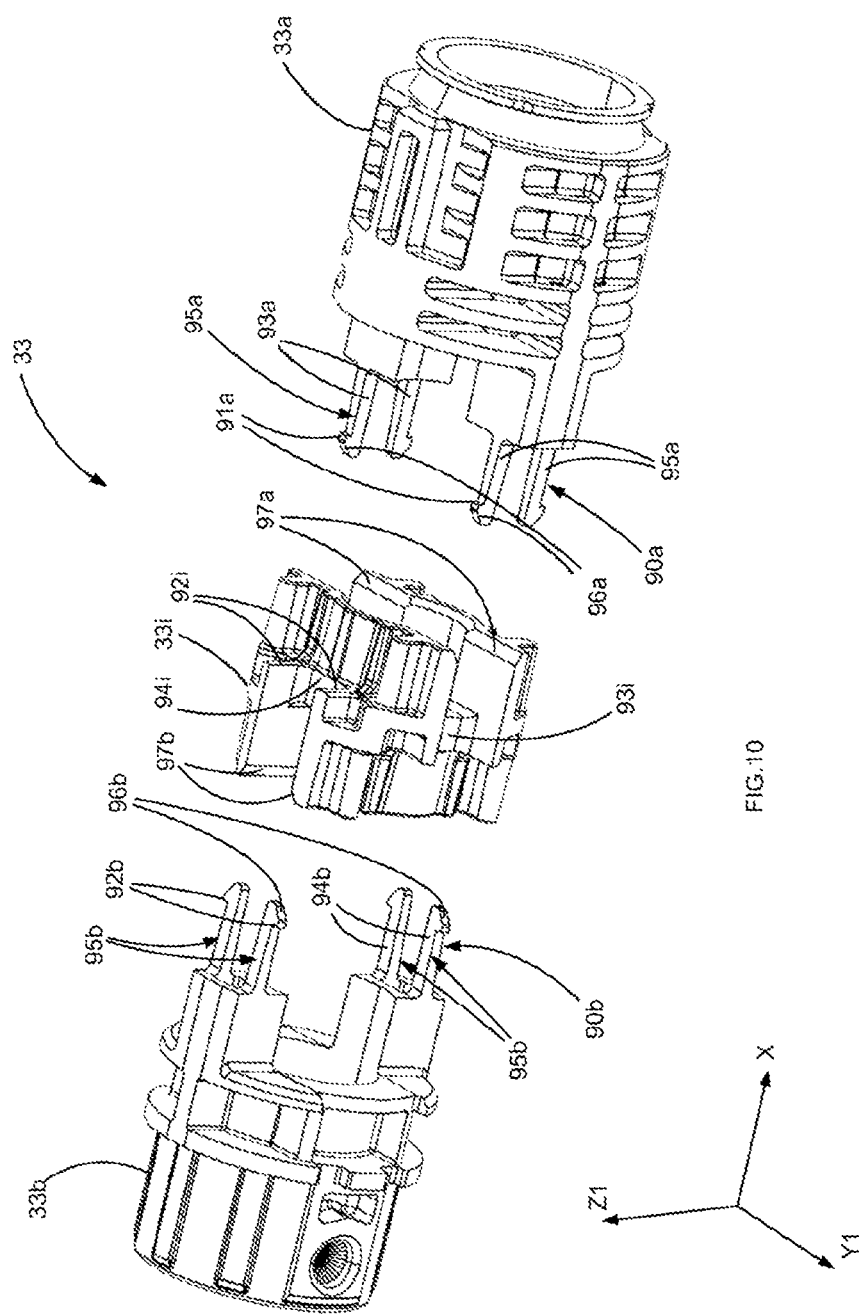
FIG. 10 is a perspective exploded view of the first mechanical vibration filtering module illustrated in FIGS. 5 and 6.
Figure 11:
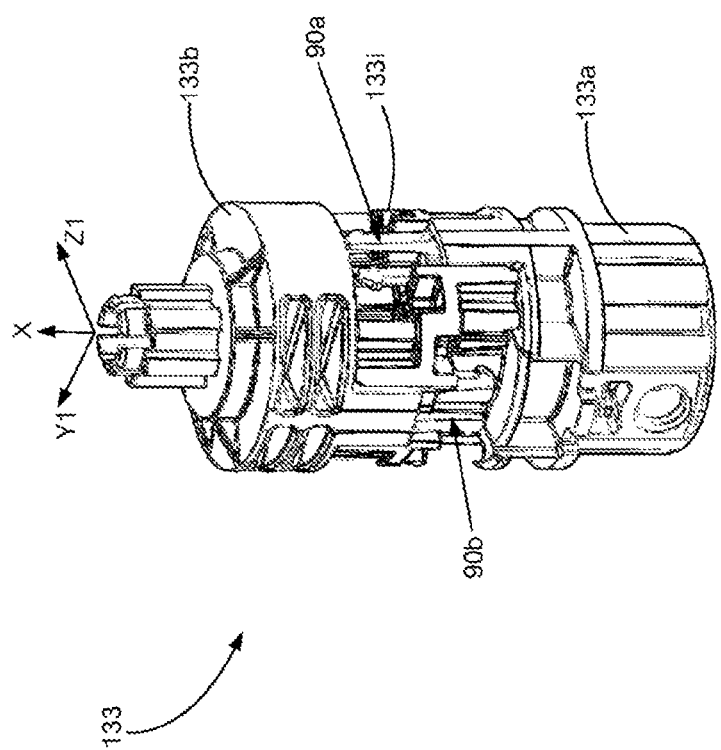
FIG. 11 is a perspective assembled view of the second mechanical vibration filtering module illustrated in FIG. 7.

Two examples of first mechanical vibration filtering module and of second mechanical vibration filtering module are represented assembled in FIGS. 9 to 11. They are described hereinbelow in more detail with reference to FIGS. 9 and 11.

The electromechanical actuator 11 can comprise a first mechanical vibration filtering module 33 of Oldham coupling type.

As seen previously, the first mechanical vibration filtering module 33 comprises:
- an input piece 33a,
- an output piece 33b,
- an intermediate piece 33i,
- a first slide link 116, on a first axis Y1, between the intermediate piece and the input piece,
- a second slide link 117, on a second axis Z1, between the intermediate piece and the output piece. The first and second axes Y1 and Z1 are perpendicular to the longitudinal axis X.

The first mechanical vibration filtering module further comprises:
- first elements 90a, 91a, 91i, 93a, 93i for limiting displacements, in translation along at least one of the first axis Y1 and the longitudinal axis X, of the input piece relatively to the intermediate piece, and/or
- second elements 90b, 92b, 92i, 94a, 94i for limiting displacements, in translation on at least one of the second axis Z1 and the longitudinal axis X, of the output piece relatively to the intermediate piece.

The electromechanical actuator 11 can advantageously comprise a second mechanical vibration filtering module 133 of Oldham coupling type.

In this case, the second mechanical vibration filtering module 133 can comprise:
- an input piece 133a,
- an output piece 133b,
- an intermediate piece 133i,
- a first slide link 116, on a first axis Y1, between the intermediate piece and the input piece,
- a second slide link 117, on a second axis Z1, between the intermediate piece and the output piece. The first and second axes Y1 and Z1 are perpendicular to the longitudinal axis X.

The second mechanical vibration filtering module then advantageously comprises:
- first elements 90a, 91a, 91i, 93a, 93i for limiting displacements, in translation on at least one of the first axis Y1 and the longitudinal axis X, of the input piece relatively to the intermediate piece, and/or
- second elements 90b, 92b, 92i, 94a, 94i for limiting displacements, in translation on at least one of the second axis Z1 and the longitudinal axis X, of the output piece relatively to the intermediate piece.

The first axes Y1 associated with the first mechanical vibration filtering module and with the second mechanical vibration filtering module are not necessarily parallel. The second axes Z1 associated with the first mechanical vibration filtering module and with the second mechanical vibration filtering module are not necessarily parallel. The first axes Y1 associated with the first mechanical vibration filtering module and with the second mechanical vibration filtering module can also be parallel. The second axes Z1 associated with the first mechanical vibration filtering module and with the second mechanical vibration filtering module can also be parallel.

The first displacement limiting elements comprise, for example:
- first tongues 90a forming part of the input piece or the intermediate piece, the first tongues extending mainly along the longitudinal axis X, and/or
- abutment surfaces 91i, 93i forming part of the intermediate piece or the input piece, notably intended to cooperate by contact with the first tongues, in particular intended to cooperate by contact with first faces 91a, 93a of the first tongues.

The second displacement limiting elements comprise, for example:
- second tongues 90b forming part of the output piece or the intermediate piece, the second tongues extending mainly along the longitudinal axis, and
- abutment surfaces 92i, 94i forming part of the intermediate piece and/or the output piece, notably intended to cooperate by contact with the second tongues, in particular intended to cooperate by contact with second faces 92b, 94b of the second tongues.

In particular, the elements 91a and 91i make it possible to limit the displacements on the longitudinal axis X. Likewise, the elements 92a and 92i make it possible to limit the displacements on the longitudinal axis X.

In particular, the elements 92a and 92i make it possible to limit the displacements on the first axis Y1. Likewise, the elements 94a and 94i make it possible to limit the displacements on the second axis Z1.

Thus, for example, the mechanical vibration filtering module 33 or 133 can be maintained by the input piece (with the longitudinal axis perpendicular to the Earth's gravitational field) without the intermediate piece being separated from the input piece and without the output piece being separated from the intermediate piece. Finally, the mechanical vibration filtering module 33 or 133 can be maintained by the input piece in any position without the intermediate piece being separated from the input piece and without the output piece being separated from the intermediate piece.

In the embodiments of FIGS. 9 to 11, the faces 94a, 94b are produced on the tongues. However, these faces can alternatively be produced elsewhere than on the tongues.

In the embodiments represented in FIGS. 9 to 11, the first tongues 90a form part of the input piece and the abutment surfaces 91i form part of the intermediate piece. However, the locations of these elements could be reversed. The tongues would thus be on the intermediate piece and the abutment surfaces would be on the input piece. As another alternative, one or more tongues could be provided on the input piece and one or more tongues could be provided on the intermediate piece.

In the embodiments represented in FIGS. 9 to 11, the second tongues 90b form part of the output piece and the abutment surfaces 92i form part of the intermediate piece. However, the locations of these elements could be reversed. The second tongues would thus be on the intermediate piece and the abutment surfaces would be on the output piece. As another alternative, one or more second tongues could be provided on the output piece and one or more tongues could be provided on the intermediate piece.

Preferably, each tongue 90a, 90b comprises at least one first flexible part 95a, 95b. This flexible part is, for example, a flexible arm 95a, 95 extending parallel to the longitudinal axis X. In the embodiments of FIGS. 9 to 11, each tongue 90a, 90b comprises two flexible arms 95a, 95b. Alternatively, one tongue or certain tongues or each tongue could comprise only a single flexible part, notably only a single flexible arm.

As in the embodiments of FIGS. 9 to 11, the tongues are preferably produced at the ends of the slides, notably at the ends of the protrusions 101, 121, 141, 161 of the slides. With such a location, the tongues can also be used to limit the travels of the slide links. However, the tongues can be produced elsewhere than at the ends of the slides. The main objective in all the embodiments is to limit the clearance between the input, intermediate and output pieces on at least one of the three axes X, Y1, Z1, preferably on all three axes.

Preferably, the tongues, in particular the flexible parts, each comprise at least one first inclined end face 96a, notably at their distal ends. In the embodiments of FIGS. 9 to 11, each tongue comprises two inclined end faces 96a. "Inclined end face" is understood to be an oriented face forming an angle that is not zero and not at a right angle with the third direction X, for example an angle of the order of 45°. The inclined faces are arranged such that, when assembling two pieces of the mechanical vibration filtering module, for example the input piece 33a with the intermediate piece 33i, an effort is exerted through the inclined surfaces, on the flexible parts of the tongues, provoking the bending thereof. Once the pieces are assembled, the effort on the inclined parts is relaxed. In this state, the flexible parts revert to their unstressed original forms under the effect of the elastic recovery of the flexible portions. The flexible parts are therefore stressed within their range of elastic deformation during assembly of the mechanical vibration filtering module. Once their original unstressed form is restored (or a deformed form that is less stressed than during assembly is restored), the abutment surfaces 91i of the second piece can interfere with the first faces 91a so as to prevent the first and second pieces from separating from one another. Separation does however remain possible after specific mechanical action on the flexible parts to shift them with respect to the abutment surfaces 91a. Preferably, the piece which bears the abutment surfaces can also be provided with ramps 97a, 97b intended to cooperate temporarily with the inclined faces 96a, 96b to facilitate assembly.

In other words, the input piece is clipped onto the intermediate piece and the output piece is clipped onto the intermediate piece.

Preferably, the first limiting elements are arranged such that the input piece and the intermediate piece have a spacing JX1 of the order of a few millimeters.

Preferably, the second limiting elements are arranged such that the output piece and the intermediate piece have a spacing JX2 of the order of a few millimeters.

Preferably, the first limiting elements are arranged such that the input piece and the intermediate piece have a spacing on the first axis Y1 of the order of a few millimeters.

Preferably, the second limiting elements are arranged such that the output piece and the intermediate piece have a spacing on the second axis Z1 of the order of a few millimeters.

In FIGS. 3 to 7, the tongues 90a, 90b are not represented.

Finally, it should be noted that, in the figures, the pieces 33a, 33i, 33b or 133a, 133i, 133b are represented with longitudinal axes coinciding with one another and coinciding with the axis X. The various pieces of the mechanical vibration filtering modules are therefore described in this configuration. However, quite obviously, the benefit of a mechanical vibration filtering module in the form of an Oldham coupling lies in the fact that a mechanical rotational torque about the longitudinal axis X (and preferably only a mechanical rotational torque about the longitudinal axis X) can be transmitted from the input piece to the output piece whether or not the input and output pieces are aligned.

Figure 12:
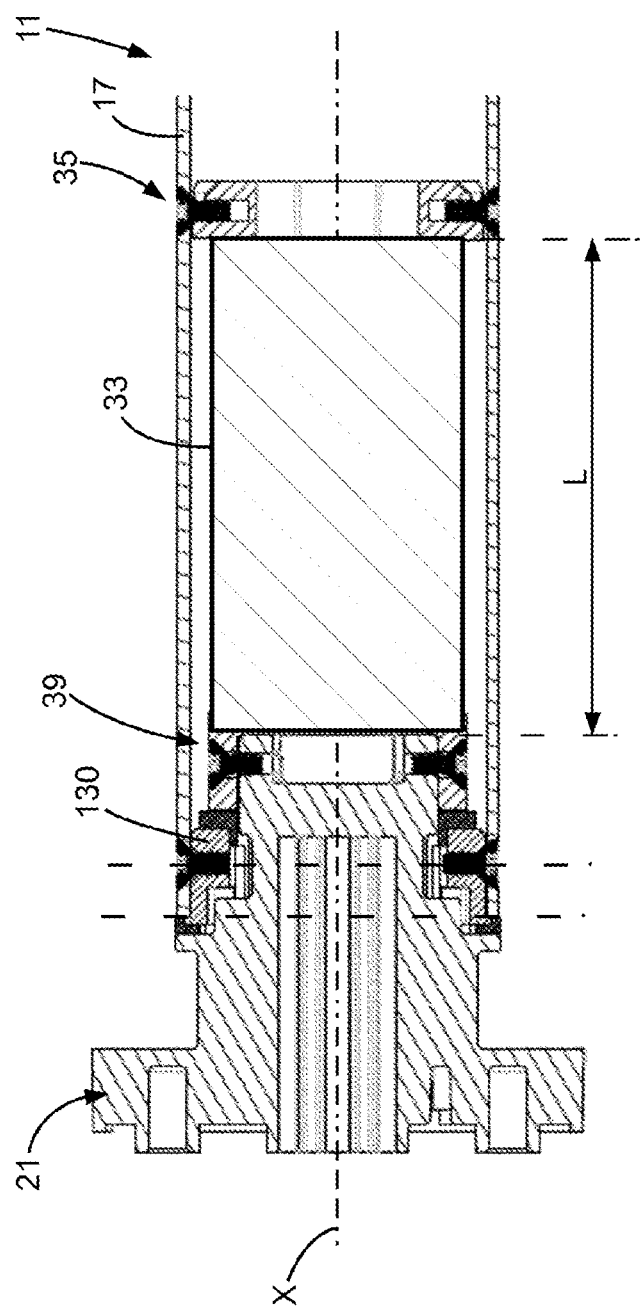
FIG. 12 is a partial cross-sectional view of another embodiment of an electromechanical actuator.

As represented in FIGS. 12 and 13, a mechanical vibration filtering module 33 as described previously can be included in an electromechanical actuator 11 for a closure, privacy or solar protection installation 6. The electromechanical actuator 11 comprises an electric motor 16, a casing 17, the mechanical vibration filtering module 33, a vibration absorption module 130 and a torque support 21, inserted at least partially into the casing 17. The mechanical vibration filtering module 33 comprises a first end 35 and a second end 39, separated by a length L. The first end 35 of the mechanical vibration filtering module 33 is mechanically linked directly or indirectly to the casing 17. The second end 39 of the mechanical vibration filtering module 33 is mechanically linked to the torque support 21. The mechanical vibration filtering module 33 ensures the mechanical link between the casing 17 and the torque support in rotation about the longitudinal axis X of the actuator. The vibration absorption module mechanically links the casing 17 to the torque support 21 in translation perpendicularly to the longitudinal axis X of the actuator by allowing a degree of freedom in rotation between the casing 17 and the torque support 21 about the longitudinal axis X.

The vibration absorption module 130 preferably comprises a first bushing 131 made of flexible material, notably of elastomer and/or viscoelastic material, disposed around a part 210 of the torque support 21, and a second bushing 132 made of rigid material, disposed around the first bushing 131 or inserted into the first bushing 131.

In a second embodiment illustrated in FIG. 8, a mechanical vibration filtering module can comprise a link of tripod type or at least bipod type, for example as defined in the patent application WO 2013/007642 A1 or in the U.S. Pat. No. 6,325,722. For example, the first mechanical vibration filtering module 33 is such that the intermediate piece 233i is linked to the input piece 233a by a first mechanical link of ball joint type, ensuring a swiveling movement between the intermediate piece 233i and the input piece 233a and the intermediate piece 233i is linked to the output piece 233b by a second mechanical link of ball joint type ensuring a swiveling movement between the intermediate piece 233i and the output piece 233b. The first and second mechanical links comprise, for example, first pins of the intermediate piece 233i cooperating with grooves of the input piece 233a (or, conversely, first pins of the input piece 233a cooperating with grooves of the intermediate piece 233i) and second pins of the intermediate piece 233i cooperating with grooves of the output piece 233b (or, conversely, second pins of the output piece 233b cooperating with grooves of the intermediate piece 233i).

Likewise or alternatively, the second mechanical vibration filtering module 133 is such that the intermediate piece 333i is linked to the input piece 333a by a third mechanical link of ball joint type, ensuring a swiveling movement between the intermediate piece 333i and the input piece 333a and the intermediate piece 333i is linked to the output piece 333b by a fourth mechanical link of ball joint type ensuring a swiveling movement between the intermediate piece 333i and the output piece 333b. The first and second mechanical links comprise, for example, first pins of the intermediate piece 333i cooperating with grooves of the input piece 333a (or, conversely, first pins of the input piece 333a cooperating with grooves of the intermediate piece 333i) and second pins of the intermediate piece 333i cooperating with grooves of the output piece 333b (or, conversely, second pins of the output piece 333b cooperating with grooves of the intermediate piece 333i).

These links of ball joint or pivot type ensure degrees of freedom radially with respect to the axis X, which allows the tripod links to cut the transmission of the vibrations in the directions Y and Z.

In a third embodiment not represented, a mechanical vibration filtering module can comprise or be a Schmidt coupling. For example: the intermediate piece 33i, 133i is linked to the input piece 33a, 133a by a first mechanical link ensuring a circular translational movement between the intermediate piece 33*i*, 133*i* and the input piece 33*a*, 133*a*, and the intermediate piece 33*i*, 133*i* is linked to the output piece 33*b*, 133*b* by a second mechanical link ensuring a circular translational movement between the intermediate piece 33*i*, 133*i* and the output piece 33*b*, 133*b*. The first and second mechanical links comprise, for example, first connecting rods linking the intermediate piece 33*i*, 133*i* and the input piece 33*a*, 133*a* and second connecting rods linking the intermediate piece 33*i*, 133*i* and the output piece 33*b*, 133*b*.

These links of ball joint or pivot type ensure degrees of freedom radially with respect to the axis X, which allows the Schmidt coupling to cut off the transmission of the vibrations in the directions Y and Z.

In the different embodiments of the mechanical vibration filtering modules 33, 133 described above, the input piece 33*a*, 233*a* of the first mechanical vibration filtering module 33 is fixed directly or indirectly to the torque support 21 and the output piece 133*b*, 333*b* of the second mechanical vibration filtering module 133 is fixed to the output shaft 20. The first and second mechanical vibration filtering modules 33, 133 also each have a second degree of freedom parallel to the longitudinal axis of the electromechanical actuator 11. This notably allows various pieces moving according to the first degree of freedom to be able to be freely displaced with respect to one another and ensure their vibration filtering function.

Preferably, the first mechanical vibration filtering module 33 is fixed directly to the casing 17 by a rigid link with no degree of freedom. Also preferably, the second mechanical vibration filtering module is fixed directly to the output shaft 20 by a rigid link with no degree of freedom.

Alternatively, the output piece 133*b* of the second mechanical vibration filtering module 133 is formed entirely by the output shaft 20.

The casing extends preferentially above each mechanical vibration filtering module to mask and protect the latter against the outside elements (dust, pollution, etc.).

The output shaft is held in rotation with respect to the casing 17 by an appropriate link, notably by a bearing-forming piece 35, that can be seen in FIG. 8.

The degree or degrees of freedom of the mechanical vibration filtering modules 33, 133 allow a radial travel relatively to the axis X of the motor assembly with respect to the casing 17. The transmission of the torque about the axis X does however remain rigid inasmuch as it does not involve elastic properties of an intermediate material such as an elastomer, but does involve rigid contacts between the parts of the couplings.

The electromechanical actuators used in the closure, privacy or solar protection installations are mainly of tubular form, that is to say of elongate cylindrical form, to be inserted into the winding tubes on which the screens are wound. They thus have a symmetry of revolution, about the longitudinal axis. They thus do not have predefined angular mounting orientation. By using couplings conforming to the invention, a degree of freedom is allowed, perpendicularly to the longitudinal axis of the actuator. Thus, it is however necessary to limit the movement of the motor assembly in the casing, perpendicularly to the longitudinal axis, so as to prevent the motor assembly from coming into rigid contact directly with the casing, notably under the effect of its own weight. This limiting is undertaken notably by the elastic module 130, which extends around the motor assembly 16.

To ensure the centering of the motor assembly 16, the elastic module 130 having a symmetry of revolution makes it possible to limit the displacement of the motor assembly 16 relatively to the casing 17 according to the first degree of freedom and avoid any direct contact between the motor assembly 16 and the casing 17.

The elastic module 130 can take the form of a bushing or of a ring made of elastic or viscoelastic material, for example made of elastomer, for example in the form of an O-ring seal or in the form of a flat ring, placed around the motor assembly. The latter can be in contact or not with the casing 17. In both cases it limits the possible radial displacement of the motor assembly with respect to the casing 17, but without being torsionally stressed. Preferably, the elastic module 130 comprises bosses or pleats on its surfaces in contact with the casing 17 and/or the motor assembly 16, the bosses being preferentially arranged parallel to an axis of symmetry X130 of the elastic module 130. This axis X130 preferably coincides with the axis X when the actuator is assembled. These bosses make it possible to limit the contact between the elastic module 130 and the motor assembly 16 and/or the casing 17, and limit the stiffness of this contact, thus making it possible to limit the transmission of vibrations. These bosses or pleats also facilitate the assembly of the motor assembly 16 in the casing 17 of the electromechanical actuator 11.

The flexibility in terms of radial compression of the elastic module 130 makes it possible to limit the radial movements of the motor assembly, on the axes perpendicular to the axis of rotation X. Although the elastic module can be subject to creep or relaxation phenomena, the latter will not have any impact on the angular position of the output shaft of the actuator. Also, the elastic module 130 having a symmetry of revolution, the stresses linked to the weight of the motor assembly 16 during prolonged stoppages will be distributed over the entire circumference of the elastic module 130 since these prolonged stoppages will take place in different angular positions.

The elastic module 130 is slidingly mounted over the motor assembly 16 and in the casing 17. It is thus held by simple contact on the motor assembly 16 and in the casing 17. Possibly, end zones 16*s*, 16*t* of the motor assembly can be provided that have a reduced diameter compared to the motor assembly 16, to make it possible to house, in each one of them, an elastic module 130, as represented in FIGS. 3 and 4.

In the different embodiments, the casing partially or completely covers the first and second mechanical vibration filtering modules and the elastic module.

In a variant not represented, the electromechanical actuator 11 can be inserted into a rail, in particular of square or rectangular section, that can be open at one or both of its two ends, in the assembled configuration of the device 3. Moreover, the electromechanical actuator 11 can be configured to drive a driving shaft on which cords for displacing and/or orienting slats of the screen 2 are wound.

Throughout this document, "surface oriented according to an axis" or "face oriented according to an axis" is understood to mean a surface or a face perpendicular to this axis, that is to say a face whose normal vector is parallel to this axis.

The invention claimed is:

1. An electromechanical actuator for a closure, privacy or solar protection installation, the electromechanical actuator comprising:
a casing, and
a motor assembly,
the motor assembly comprising:
an electric motor and a reduction gear, a first mechanical vibration filtering module,
a second mechanical vibration filtering module, and
an output shaft, inserted at least partially into the casing of the electromechanical actuator,
wherein
the electromechanical actuator extends along a longitudinal axis,
the first and second mechanical vibration filtering modules are disposed on opposite sides of the motor assembly along the longitudinal axis,
each of the first and second mechanical vibration filtering modules comprises a rigid transmission coupling, having at least a first degree of freedom perpendicularly to the longitudinal axis of the electromechanical actuator allowing a displacement of the motor assembly on a plane perpendicular to the longitudinal axis of the electromechanical actuator, and
the electromechanical actuator further comprises at least one elastic module limiting the displacement of the motor assembly on the plane perpendicular to the longitudinal axis of the electromechanical actuator.

2. The electromechanical actuator as claimed in claim 1, wherein the first mechanical vibration filtering module comprises:
a first input piece mechanically linked directly or indirectly to a torque support,
a first output piece mechanically linked directly or indirectly to the motor assembly, and
a first intermediate piece linked on a first side to the first input piece and on a second side to the first output piece, the first intermediate piece having at least one degree of freedom in translation in a direction perpendicular to the longitudinal axis with respect to the first input piece, and at least one degree of freedom in translation in a direction perpendicular to the longitudinal axis with respect to the first output piece,
and wherein the second mechanical vibration filtering module comprises;
a second input piece mechanically linked directly or indirectly to a torque support,
a second output piece mechanically linked directly or indirectly to the motor assembly, and
a second intermediate piece linked on a first side to the second input piece and on a second side to the second output piece, the second intermediate piece having at least one degree of freedom in translation in a direction perpendicular to the longitudinal axis with respect to the second input piece and at least one degree of freedom in translation in a direction perpendicular to the longitudinal axis with respect to the second output piece.

3. The electromechanical actuator as claimed in claim 2, wherein the first output piece of the first mechanical vibration filtering module comprises an external interface comprising external splines and designed to be connected to the motor assembly.

4. The electromechanical actuator as claimed in claim 3, wherein the second input piece of the second mechanical vibration filtering module comprises an internal interface provided with internal ribs and designed to be connected to an output shaft of the motor assembly.

5. The electromechanical actuator as claimed in claim 2, wherein the first and second intermediate pieces of the first mechanical vibration filtering module and of the second mechanical vibration filtering module are identical.

6. The electromechanical actuator as claimed in claim 2, wherein the first output piece of the first mechanical vibration filtering module is identical to the second input piece of the second mechanical vibration filtering module.

7. The electromechanical actuator as claimed in claim 1, wherein at least one selected from the group consisting of the rigid transmission coupling of the first mechanical vibration filtering module and the second mechanical vibration filtering module has a second degree of freedom parallel to the longitudinal axis of the actuator.

8. The electromechanical actuator as claimed in claim 1, wherein at least one selected from the group consisting of the first mechanical vibration filtering module and the second mechanical vibration filtering module comprises an Oldham coupling or a Schmidt coupling or a tripod coupling.

9. The electromechanical actuator as claimed in claim 1, wherein the first mechanical vibration filtering module is hollow.

10. The electromechanical actuator as claimed in claim 1, wherein the elastic module comprises a bushing or a ring made of flexible material and disposed around the motor assembly.

11. The electromechanical actuator as claimed in claim 10, wherein the elastic module comprises bosses forming a surface or surfaces of the elastic module in contact with at least one selected from the group consisting of the casing and the motor assembly.

12. The electromechanical actuator as claimed in claim 1, wherein the first mechanical vibration filtering module comprises at least one fixing element for fixing to the casing.

13. The electromechanical actuator as claimed in claim 1,
wherein the electromechanical actuator comprises, inserted at least partially into the casing of the electromechanical actuator:
the motor assembly, comprising the electric motor and the reduction gear,
the output shaft, and
at least the first mechanical vibration filtering module,
wherein
the electromechanical actuator extends along the longitudinal axis,
the first mechanical vibration filtering module is disposed along the longitudinal axis and comprises a rigid transmission coupling, having at least one first degree of freedom perpendicular to the longitudinal axis of the electromechanical actuator, allowing a displacement of the motor assembly on a plane perpendicularly to the longitudinal axis of the electromechanical actuator, and
the first mechanical vibration filtering module comprises:
an input piece,
an output piece,
an intermediate piece,
a first slide link, on a first axis, between the intermediate piece and the input piece,
a second slide link, on a second axis, between the intermediate piece and the output piece, the first axis and the second axis being perpendicular to the longitudinal axis of the electromechanical actuator, and
at one selected from the group consisting of (i) first elements for limiting displacements, in translation on at least one of the first axis and the longitudinal axis, of the input piece relatively to the intermediate piece, and (ii) second elements for limiting displacements, in translation on at least one of the second axis and the longitudinal axis, of the output piece relatively to the intermediate piece.

14. The electromechanical actuator as claimed in claim 13, wherein the first displacement-limiting elements comprise:
first tongues forming part of the input piece or of the intermediate piece, the first tongues extending mainly along the longitudinal axis, and
abutment surfaces forming part respectively of the intermediate piece or of the input piece.

15. The electromechanical actuator as claimed in claim 13, wherein the second displacement-limiting elements comprise:
second tongues forming part of the output piece or of the intermediate piece, the second tongues extending mainly on the longitudinal axis, and
abutment surfaces forming part respectively of the intermediate piece or of the output piece.

16. The electromechanical actuator as claimed in claim 14, wherein at least one of the following:
each first tongue comprises at least one first flexible part,
each second tongue comprises at least one second flexible part.

17. The electromechanical actuator as claimed in claim 16, wherein at least one of the following:
each first tongue comprises at least one first inclined end face,
each second tongue comprises at least one second inclined end face.

18. The electromechanical actuator as claimed in claim 13, wherein the input piece of the first mechanical vibration filtering module is mechanically linked directly or indirectly to a torque support, and the output piece is mechanically linked directly or indirectly to the motor assembly.

19. The electromechanical actuator as claimed in claim 1, wherein the second mechanical vibration filtering module comprises:
an input piece,
an output piece,
an intermediate piece,
a first slide link on a first axis, between the intermediate piece and the input piece,
a second slide link, on a second axis, between the intermediate piece and the output piece, the first axis and the second axis being perpendicular to the longitudinal axis of the electromechanical actuator, and
at least one selected from the group consisting of (i) first elements for limiting displacements, in translation along at least one of the first axis and the longitudinal axis, of the input piece relatively to the intermediate piece, and (ii) second elements for limiting displacements, in translation on at least one of the first axis and the longitudinal axis, of the output piece relatively to the intermediate piece.

20. The electromechanical actuator as claimed in claim 13, further comprising a vibration absorption module and a torque support inserted at least partially into the casing, wherein
the input piece of the first mechanical vibration filtering module mechanically linked directly or indirectly to the casing,
the output piece of the first mechanical vibration filtering module is mechanically linked to the torque support, and
the mechanical vibration filtering module ensures a mechanical link between the casing and the torque support in rotation about the longitudinal axis of the actuator, the vibration absorption module mechanically linking the casing to the torque support in translation perpendicularly to the longitudinal axis of the actuator by allowing a degree of freedom in rotation between the casing and the torque support about the longitudinal axis.

21. The actuator as claimed in claim 20, wherein the vibration absorption module comprises a first bushing made of flexible material, and disposed around a part of the torque support and a second bushing made of rigid material and disposed around the first bushing or inserted into the first bushing.

22. A closure, privacy or solar protection home-automation installation comprising:
a screen,
a winding tube, and
an electromechanical actuator as claimed in claim 1,
wherein the screen is able to be wound onto the winding tube driven in rotation by the electromechanical actuator.

* * * * *